US011865076B2

(12) United States Patent
Genosar

(10) Patent No.: US 11,865,076 B2
(45) Date of Patent: Jan. 9, 2024

(54) CLOSED SYSTEM FOR TRANSFERRING MEDICATION FROM A FLEXIBLE CONTAINER

(71) Applicant: AKTIVAX, Inc., Broomfield, CO (US)

(72) Inventor: Amir Genosar, Broomfield, CO (US)

(73) Assignee: Aktivax, Inc., Broomfield, CO (US)

( * ) Notice: Subject to any disclaimer, the term of this patent is extended or adjusted under 35 U.S.C. 154(b) by 263 days.

(21) Appl. No.: 16/953,059

(22) Filed: Nov. 19, 2020

(65) Prior Publication Data

US 2021/0154098 A1 May 27, 2021

Related U.S. Application Data

(60) Provisional application No. 62/939,197, filed on Nov. 22, 2019.

(51) Int. Cl.
*A61J 1/20* (2006.01)
*A61J 1/14* (2023.01)

(52) U.S. Cl.
CPC ........... *A61J 1/2096* (2013.01); *A61J 1/1406* (2013.01); *A61J 1/201* (2015.05); *A61J 1/2027* (2015.05); *A61J 1/2037* (2015.05); *A61J 1/2048* (2015.05)

(58) Field of Classification Search
CPC ...... A61J 1/2096; A61J 1/2093; A61J 1/2089; A61J 1/2048; A61J 1/2051; A61J 1/2058; A61J 1/2062; A61J 1/1406; A61J 1/1481; A61J 1/1487; A61J 1/1475; A61J 1/2006; A61J 1/201; A61M 5/1782
See application file for complete search history.

(56) References Cited

U.S. PATENT DOCUMENTS 5,562,616 A * 10/1996 Haber .................. A61J 1/2089 604/82
2005/0096627 A1 5/2005 Howard
2009/0018506 A1* 1/2009 Daily ................. A61M 5/3287 604/263
2014/0008366 A1* 1/2014 Genosar ............. A61M 5/3202 220/265
2016/0325085 A1* 11/2016 Chelak ...................... F16K 7/20
2018/0200498 A1* 7/2018 Sanders ................ A61J 1/1406
2019/0321261 A1 10/2019 Oshinski et al.

FOREIGN PATENT DOCUMENTS

WO 2013096911 A1 6/2013
WO 2017211850 A1 12/2017

* cited by examiner

*Primary Examiner* — Erich G Herbermann
*Assistant Examiner* — Seth Han
(74) *Attorney, Agent, or Firm* — Holzer Patel Drennan

(57) ABSTRACT

A closed transfer system for transferring metered dose of a beneficial agent from a flexible primary container to a second reservoir or to a patient. The system can be configured to transfer multiple doses.

18 Claims, 7 Drawing Sheets

CLOSED SYSTEM FOR TRANSFERRING MEDICATION FROM A FLEXIBLE CONTAINER

FIELD

The present disclosure pertains to the field of drug preparation and delivery. More specifically the present disclosure pertains to a Closed System Transfer Device (CSTD) for compounding, transferring, and administering hazardous drugs.

BACKGROUND

In the process of preparing a drug for administration, it is sometimes required to transfer a measured amount of a medication from a primary container into a drug delivery system such as an infusion reservoir, infusion line, or directly to the patient. Exposure of the preparer, typically a pharmacist or other healthcare practitioner, to the medication may present a health risk and precautions need to be taken to minimize or completely eliminate this risk. Examples of hazardous medications include chemotherapy drugs such antineoplastic drugs, antiviral drugs, and hormones.

Drugs that are contained in rigid primary containers such as glass vials present a particular challenge because transferring material into or from the vial is likely to cause pressure imbalance between ambient air pressure and pressure in the vial. This pressure imbalance may result in a leak of the drug and aerosolization that increase the risk of user exposure to the hazardous substance. Another risk associated with handling of hazardous substances includes drug residues left on exposed surfaces of drug transfer system connectors. A common connector in liquid drug systems is the Luer connector found on most parenteral syringe tips as well as ports of intravenous (IV) bags and IV infusion lines. While Luer connector features a reliable fluid-tight seal when connected, Luer connectors may leave wet, exposed surfaces and/or open lines when disconnected. This may allow drug leakage and aerosolization when using Luer connectors.

Several systems have been proposed to reduce the risk of user exposure to hazardous substances when drawn from a vial with a syringe, and are generally referred to in the healthcare industry as closed transfer systems or Closed System Transfer Devices (CSTDs). Closed transfer systems usually provide a solution to at least one of the two significant contributors to drug exposure: a) pressure differential between the primary container and atmosphere, and b) drug residue on exposed surfaces of the fluidic system components such as the tip of a syringe, the vial stopper, or the IV system port.

One example of a close transfer system is the commercially available Tevadaptor™ system, a trademark of Teva Pharmaceuticals (Petach Tikva, Israel), an illustrative example of which is U.S. Pat. No. 7,670,326. The Tevadaptor™ system consists of a series of interconnecting adapters configured to interface with a variety of regular components involved in compounding for IV administration, including adapters for vial, IV bag port, IV line port, and syringes. The Tevadaptor™ vial adapter contains an air filtering system that allows continuous balancing of the pressure in the vial and ambient air when a dose is drawn from the vial, while preventing any contamination from penetrating the vial or aerosols from leaving the vial. The Tevadaptor™ vial adapter as well as its other adapters are equipped with connectors configured to minimize or eliminate drug residues on the connectors' exposed surfaces. In the Tevadaptor™ system each line terminal is hermetically sealed by a rubber septum when the connector is not connected. Fluid communication is established between a male and a female connector only after the septum of each side has been engaged in a fluid-tight fashion, at which point a hollow needle penetrates the septum terminal on each side forming a fluid passageway. In the same manner, when terminals are disconnected the hollow needle is retracted prior to the two septa disengaging from each other, leaving a dry exposed surface.

Another example of a closed system transfer device is the Equashield system, a trademark of Equashield™ (Port Washington, NY, USA) an illustrative example of which is U.S. Pat. No. 8,196,614. The Equashield™ system includes a special syringe featuring a pressure equalizing system wherein a dedicated air passageway is established across sealed terminal connectors (such as a vial stopper), in parallel to the drug passageway, that communicates a closed air compartment located behind the syringe plunger with the drug compartment. Pressure across the connector is balanced by allowing air (and drug vapors) to move to and from this special compartment. The Equashield™ system further includes leak-tight terminal adaptors similar to the Tevadaptor™ connectors.

Another CSTD is the Phaseal™ system, a trademark of BD (Franklin Lake, NJ), an illustrative example of which is U.S. Pat. No. 6,715,520 that includes a vial adapter that is set between a vial and a syringe and contains an inflatable air bladder. The air bladder is made from a flexible material that maintains pressure equilibrium with the ambient air and allows air to freely move into and from the vial and the bladder. The Phaseal™ system further includes terminal adaptors similar to the Tevadaptor™ connectors in an attempt to reduce or avoid leaks.

Other CSTDs include Hospira's (Lake Forest, IL) LifeShield™ ChemoClave™ Series, and ICU's (San Clemente, CA) ChemoLock™.

SUMMARY

In the present disclosure, it has been recognized that there are a number of problems with the proposed CSTDs contemplated to date. One problem with the proposed CSTDs is the complexity of the system components required to maintain pressure between the vial and the rigid vial close to equilibrium, which translate to high manufacturing costs which render these systems cost-prohibitive in many applications and settings.

Another problem is that, while the vials may contain more than one dose of a drug, the syringe needs to be disconnected and reconnected to the vial to draw each additional dose. It is a common practice in pharmacies to use a single multi-dose vial to prepare several infusion bags for administration. However, as certain published studies indicate, none of the previous CSTDs are completely leak-free and, as such, each disconnection presents a risk of drug exposure. Reconnection of the CSTD system components also presents a risk of contaminating the drug.

Another problem is that terminal connectors of the proposed CSTDs are near leak-free only when the system is operated properly. However, when the syringe is loaded with a drug and disconnected from the vial, its rubber septum terminal has already been pierced (when the drug was drawn from the vial), thus providing a path for potential exposure to the drug in the syringe. The rubber septum terminal of the syringe may provide an adequate fluid-tight seal when the compound is not pressurized, but if the drug in the syringe is pressurized while the syringe terminal is not connected to another system component, it is likely that the drug will leak through the pierced area in the septum. The drug in the syringe may be mistakenly pressurized by a user in error, or when the plunger rod is impacted, for instance if the syringe is accidentally dropped on the floor.

It is another problem of CSTDs that they do not mitigate dosing errors. CSTD syringes are generically graduated as they are anticipated to be used with a variety of drugs and dose sizes.

It is yet another problem of CSTD syringes that they are not pre-marked with the specific drug that they contain. Once a syringe has been disconnected from the primary container, it becomes a user discretion, and therefore a possible procedural error mode, to label the syringe. This is a particular concern if the content of the syringe is not immediately transferred from the syringe to an IV system or administered to the patient. It also presents a concern if the pharmacy preparation procedure allows using the same syringe to transfer multiple doses, leaving room for a mismatch of syringe and primary container.

In view of the foregoing, it is presently recognized that the need remains to have a simplified CSTD that is less costly to manufacture. It is also desired to have a CSTD that allows metering transfers of multiple doses safely, without having to disconnect the syringe from the primary container. It is also desired to have a safer CSTD that prevents drug leakage through the septum terminal if the syringe is accidently pressurized when it is not connected to other system components. It is also desired to have a CSTD that provides drug-specific graduation to reduce the risk of dosing errors. It is also desired to have a CSTD syringe that is labeled with the drug information until the content has been transferred from the syringe, or the use of the syringe for multiple transfers has been completed.

The present disclosure presents a CSTD that facilitates improvements to the previously proposed CSTD that, for example, reduce or eliminate the shortfalls of the proposed CSTD systems described above. The CSTD facilitates compounding, transferring, and administering a metered dose of a beneficial agent from a primary container to a reciprocal port of at least one of a second reservoir, an IV container, and IV line, directly to a patient (for instance through a needle a catheter, or a nozzle), or to another desired destination, together hereafter referred to as destinations.

According to one aspect of the present disclosure, the CSTD comprises a primary container comprising a flexible wall, a leak-tight delivery port, a metering pump capable of removing a metered dose from the primary container and moving said dose through the delivery port to a reciprocal destination port, and a valve communicating between said primary container, metering pump, and delivery port. While a metering pump is described throughout the present disclosure, it may be appreciated any form of metering device capable of removing the metered dose from the primary container and moving said dose through the delivery port to a reciprocal destination port may be utilized without limitation. In turn, when the delivery port is not connected to a destination port, the valve is in a metering state wherein bidirectional fluid communication between the primary container and the metering pump is enabled, and fluid communication through the delivery port is disabled. When the delivery port is connected to a destination port, the valve is in a delivery state wherein fluid communication between the metering pump and the destination is enabled, and fluid communication between the primary container and metering pump is disabled.

According to one aspect of the present disclosure, direct fluid communication between the primary container and the delivery port is disabled in both the metering state and the delivery state.

The flexible wall of the primary container presents a barrier between the beneficial agent and the ambient air providing pressure equilibrium between the beneficial agent and ambient air pressure. The primary container wall is capable of collapsing in or bulging out (e.g., elastically or plastically expanding) to adjust the primary container volume as the beneficial agent is moved into or out of the primary container. This inherent pressure equalizing capability is an important advantage as it eliminates the need for the complex systems that are required to achieve similar result with rigid containers such as vials.

In one arrangement the primary container is made from at least one of a film or a foil. The primary container may comprise a pouch, a sachet, a flexible tube, and a molded container. In one arrangement the primary container is preformed. In one arrangement the primary container comprises a deformable wall, moveable (forcible) between a first preformed state in which it structurally defines (holds, delineates, self sustains, or independently sustains) a fillable cavity, configured (sized) to receive the beneficial agent, to a deformed state in which said volume is substantially depleted, moving the beneficial agent to the metering pump.

In one arrangement the primary container comprises a wall made from a flexible material and it comprises a beneficial agent compartment, defined by a seal of the wall (e.g., a peripheral seal extending about at least a portion of the beneficial agent compartment), and wherein the compartment wall is preformed in a perpendicular direction to this seal (e.g., the compartment wall may extend generally perpendicularly from the seal).

In one arrangement the primary container comprises at least two compartments: a first compartment containing at least a first constituent of the beneficial agent, and at least a second compartment containing at least a second constituent of the beneficial agent. The compartments may be separated by a frangible seal that, when opened, allows the first and the second constituents to aseptically merge.

In one arrangement the primary container flexible package is at least partially supported by a rigid or semi-rigid backing. This backing can facilitate manipulation of the package (e.g., digital manipulation by a user's finger), for example, for breaking a frangible seal between the beneficial agent compartment and the valve, or between two adjacent constituent compartments of the primary container.

In one arrangement, the backing may interface the primary container with the valve. In one arrangement, the valve is accommodated in the backing (e.g., the valve may be formed integrally with the backing). In one arrangement, the metering pump may be supported by the backing. In one arrangement, the metering pump may be integrated into the backing. In one arrangement, the primary container content information may be labeled on the primary container (e.g., on the backing). In one arrangement, the backing may be moveable relative to the valve and can manipulate the valve between a metering state and a dispensing state. In one arrangement, when the CSTD is in the metering state, the backing may physically prevent connecting the delivery port to a destination port.

In one arrangement, when the CSTD is in the delivery state and is connected to a destination port, the backing may physically prevent moving the valve to a metering state.

According to one aspect of the present disclosure, the CSTD is capable of sequentially transferring multiple metered doses of the beneficial agent from the primary container to a destination or multiple destinations, while the primary container remains connected to the valve and the metering pump, advantageously reducing the number of connections and disconnections in this process, compared to the previously proposed CSTD solutions, thereby reducing the risk of drug exposure.

The metering pump can comprise a syringe, a bellows, or other positive displacement arrangements capable of removing a known amount of beneficial agent from the primary container and transferring the same through the delivery port.

According to one aspect of the present disclosure, the valve, unless when the delivery port is engaged with a destination port, may aspirate to the primary container such that if the beneficial agent in the metering pump is accidentally pressurized, for example by unintentional operation of the plunger rod of a syringe, the beneficial agent will flow back to the primary container rather than develop pressure behind the leak-tight delivery port. This is an important advantage over prior art where in similar situation pressure will develop behind the leak-tight delivery port which may result in a leak.

According to one aspect of the present disclosure, the metering pump is in a general form of a syringe, and the syringe may remain connected to the valve, the delivery port, and the primary container throughout the procedure of drawing (metering) a dose into the syringe, connecting the delivery port to a destination port, transferring the metered dose from the syringe to the destination port, disconnecting the delivery port from the destination port, and, as needed, repeating the process to transfer another dose to the same or a different destination. This arrangement presents an important advantage over the prior art as, by keeping the syringe and the primary container connected, the syringe remains labeled at all time with the primary container label, reducing the risk of syringe mismatch and therefore the risk of unintentional administration of a wrong drug. Additionally, as will be illustrated below, certain arrangements of the CSTD, may have the syringe positioned relative to the primary container label in such a way that information can be printed on the label to facilitate proper dose metering. For instance, the label may be present graphics of a scale along the syringe's barrel that convert the dose volume to other relevant metrics such as weight of the beneficial agent in micrograms, and/or patient weight to dose volume or weight of the beneficial agent. This additional label information allows the user to confirm the calculated dose volume from the prescription and reduce room for calculation errors.

According to one aspect of the present disclosure, the CSTD arrangement is a prefilled device comprising a primary container, a syringe (or other metering pump), and a valve comprising a leak-tight delivery port. As such, the syringe barrel can be marked with product-specific graduation rather than the generic milliliter graduation that may be used. The graduation scale can represent the beneficial agent weight, and/or the patient weight. For beneficial agents that are prescribed in known aliquots the scale can have only those markings to further reduce dose metering errors.

According to another aspect of the present disclosure, a valve comprises a leak-tight delivery port capable of communicating with a destination port, wherein said valve is configured to communicate with: a primary container comprising a flexible wall, a metering pump capable of removing a metered dose from the primary container and pushing said dose through the delivery port to a reciprocal destination port, and the arrangement is such that when the valve is communicating with the metering pump and the primary container, and: when the delivery port is not connected to a destination port, the valve is in a metering state wherein bidirectional fluid communication between the primary container and the metering pump is enabled, and fluid communication through the delivery port is disabled, and when the delivery port is connected to a destination port, the valve is in a delivery state wherein fluid communication between the metering pump and the destination is enabled, and fluid communication between the primary container and metering pump is disabled.

According to one aspect of said valve, direct fluid communication between the primary container and the delivery port is disabled in both the metering state and the delivery state.

According to one aspect of the present disclosure the CSTD arrangement further comprises a destination port, configured to manipulate the valve from the metering state wherein the destination port is disengaged from the delivery port, to the delivery state wherein the destination port is engaged with the delivery port.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
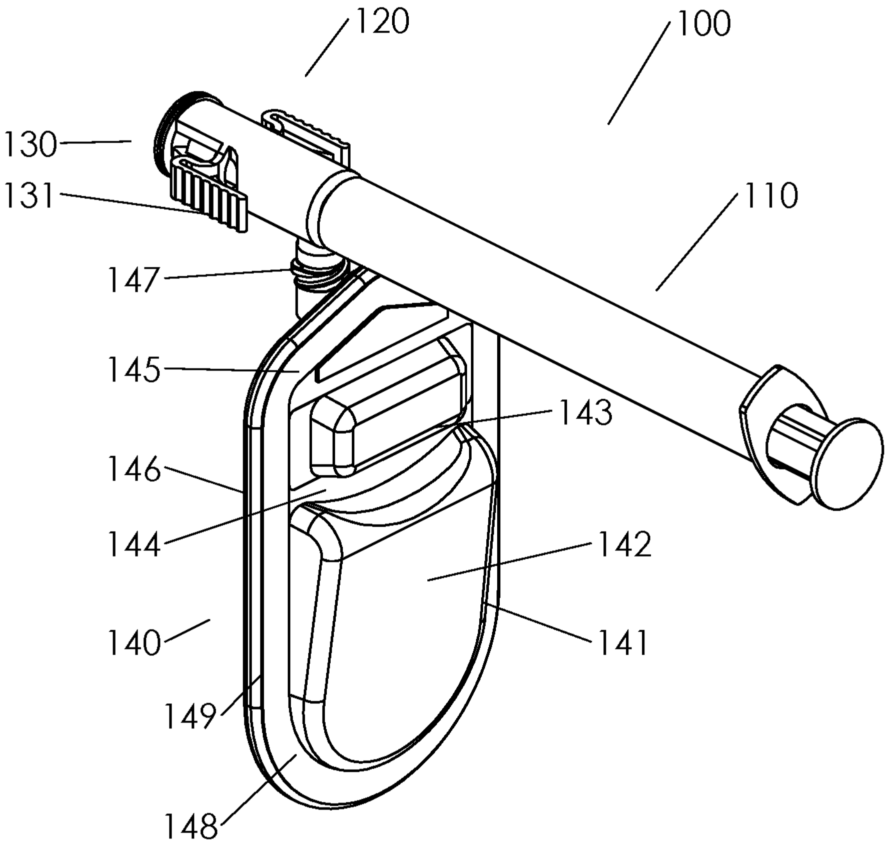
FIG. 1 illustrates a general view of a CSTD arrangement.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 illustrates a general view of a CSTD arrangement 100 according to the present disclosure. The CSTD arrangement 100 is configured to compound, transfer and administer a metered dose of a beneficial agent from a primary container to a reciprocal port of at least one of a second reservoir, an intravenous (IV) container, and IV line, directly to a patient (for instance through a needle a catheter, or a nozzle), or to another desired destination, together hereafter referred to as destinations.

In one embodiment, the CSTD arrangement 100 for storing a beneficial agent and transferring the beneficial agent to a destination port may include a primary container 140 comprising a package 141 for storing the beneficial agent comprising at least one flexible wall 148 such that pressure in the primary container 140 is substantially equalized to ambient air pressure; a metering pump 110; a delivery port 130 for communicating the beneficial agent with the destination port; a valve 120 in fluid communication with the primary container 140, the metering pump 110, and the delivery port 130, the valve 120 may include a valve housing, wherein the primary container 140 extends from the valve housing, the metering pump 110 may be joined to the valve housing, and the delivery port 130 may be an opening in the valve housing configured to accommodate the destination port. The valve 120 may be moveable from a first configuration where it is not engaged with the destination port, to a second configuration where it is engaged with the destination port. In the first configuration the primary container 140 and the metering pump 110 may be in fluid communication and neither may be in fluid communication with the delivery port 130. In the second configuration the metering pump 110 may be in fluid communication with the delivery port 130 and neither may be in fluid communication with the primary container 140. The flexible wall 148 collapses when the beneficial agent is transferred from the primary container 140 to the metering pump 110 (e.g., to equalize any pressure imbalance in the primary container 140 in response to the removal of the beneficial agent therefrom).

The metering pump 110 may be capable of removing a metered dose of a beneficial agent from the primary container 140 and pushing said dose through the delivery port 130 to a reciprocal destination port. In one embodiment the metering pump 110 is a syringe. In some embodiments the pump 110 comprises a graduation correlating to dosing options of the beneficial agent.

The flexible wall 148 of the package 141 presents a barrier between the beneficial agent and ambient air that allows for pressure equilibrium between the beneficial agent and ambient air pressure. The primary container wall 148 is capable of collapsing in, or bulging out (e.g., plastically or elastically deforming), to adjust the primary container 140 volume as the beneficial agent is moved into or out of the primary container 140. This inherent pressure equalizing capability eliminates the motive force for leakage from the CSTD arrangement 100. The flexible wall 148 of the package 141 comprises at least one of a film, a foil, or a thin molded or blow-molded component. The package 141 may comprise a pouch, a sachet, a flexible tube, and a molded container. The flexible wall 148 may be performed, and may be deformable, between a first preformed state in which it structurally defines a fillable cavity of the first compartment 142, configured to receive the beneficial agent, to a deformed state in which said volume of the primary container 140 is substantially depleted, the beneficial agent having been moved to the metering pump 110. The first compartment 142 may be defined by a peripheral seal 145 between a first wall 148 and a second wall 149 of the package 141, and wherein the compartment wall 148 is preformed in a perpendicular direction to this seal 145.

In some embodiments the package 141 may include two compartments: a first compartment 142 containing at least a first constituent of the beneficial agent, and a second compartment 143 containing at least a second constituent of the beneficial agent. The first compartment 142 and the second compartment 143 may be separated by a frangible seal 144 that, when opened, allows the first and the second constituents of the beneficial agent to aseptically merge. The package 141 may be supported by a rigid or semi-rigid backing 146. The backing 146 can facilitate digital manipulation of the package 141 for example for breaking the frangible seal 144 by depressing the first compartment 142 (e.g., by a finger of a user). The backing 146 may interface the primary container 140 and the valve 120 via connector 147. The CSTD arrangement 100 can be provided to the user when the primary container 140 and the metering pump 110 are pre-assembled, in which case the CSTD arrangement 100 would be considered a prefilled drug delivery system. In another arrangement of the CSTD 100, at least one of the metering pump 110 and the primary container 140 are assembled to the valve 120 post-manufacturing, e.g. by the user.

As will be further illustrated in FIG. 2, the delivery port 130 may comprise a leak-tight connector that may have a substantially similar configuration to the connector implemented in the Tevadaptor™ system described above. In one embodiment the CSTD arrangement 100 may include a latch mechanism for holding the destination port joined to the delivery port such that the valve remains in the second configuration. In this embodiment the wing-shaped cantilever arms 131 are operable to release a latched connection with a port of a destination. In one arrangement the connector 147 allows changing the position and orientation of the primary container 140 relative to the pump 110. In one arrangement a tube connects between the connector 147 and the valve 120.

Figure 2A:
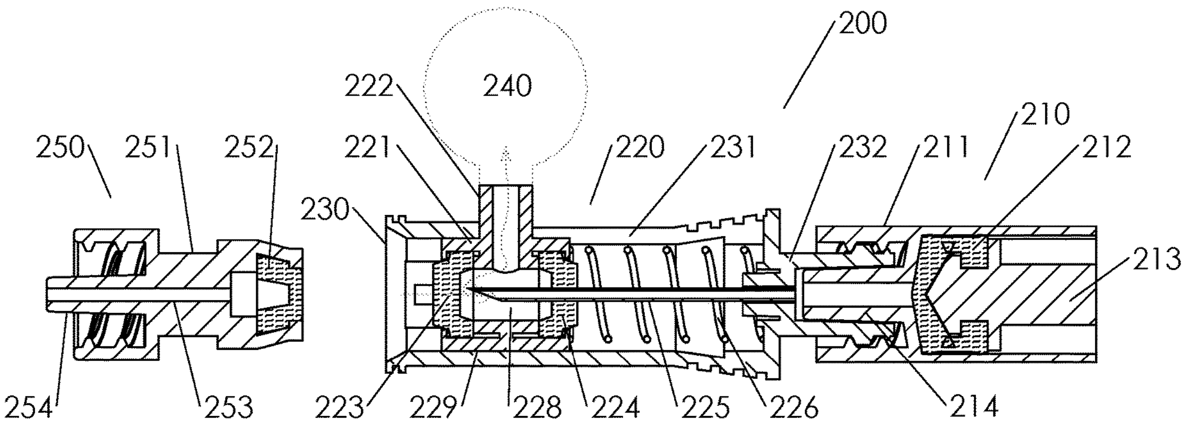
FIGS. 2*a*-2*c* illustrate cross section view of operational states of a CSTD arrangement.
Figure 2B:
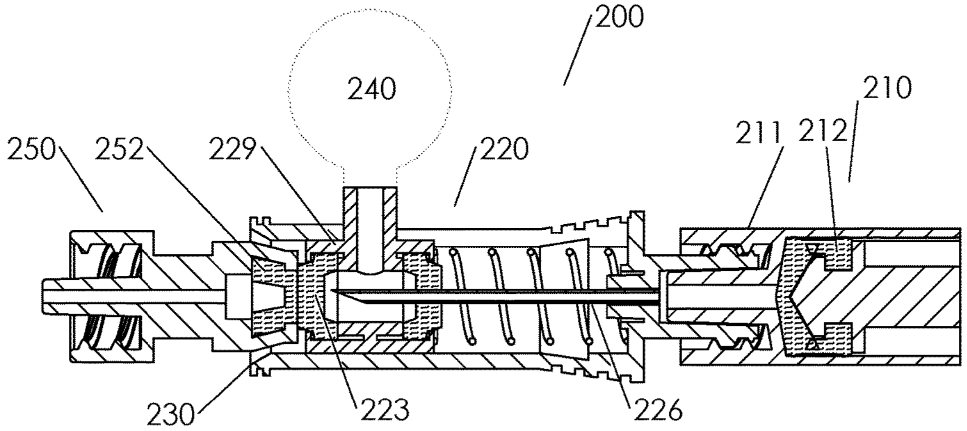
Figure 2C:
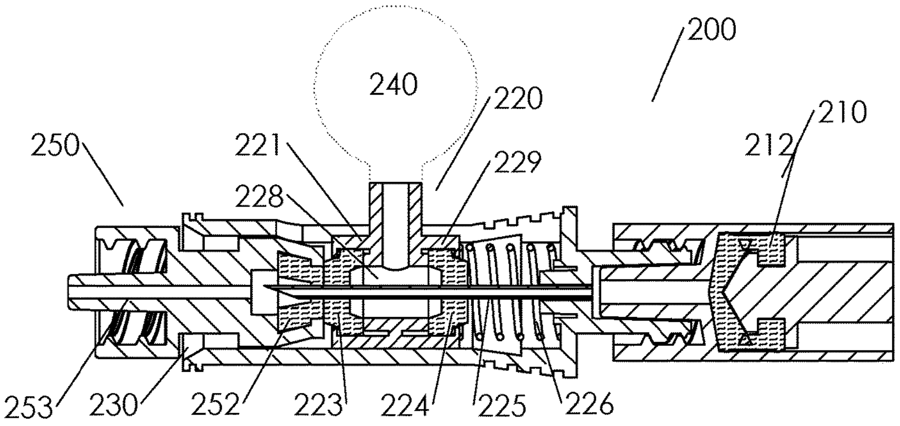

FIGS. 2*a* to 2*c* illustrate cross-section cut out views of a CSTD arrangement 200, of a similar arrangement to CSTD 100 of FIG. 1, in three operational states. FIG. 2*a* illustrates the first operational state where the CSTD arrangement 200 and the destination are not in contact and the CSTD arrangement 200 is in the first configuration, also referred to as the metering state. FIG. 2*b* illustrates CSTD arrangement 200 in the second operational state where the CSTD arrangement 200 is in contact with the destination but remains in the first configuration or metering state. FIG. 2*c* illustrates the CSTD 200 in the third operational state where it is in fluid communication with the destination, and CSTD 200 is in the second configuration, also referred to as the delivery state.

The CSTD arrangement 200 comprises a primary container 240, a metering pump in a form of a syringe 210, a leak-tight delivery port 230, and a valve 220, communicating between said primary container 240, the syringe 210, and the delivery port 230 configured to communicate with a reciprocal port of a destination. Such a destination may be, but is not limited to, a container, an IV bag, and IV line, a vial, a delivery device, and a connector, an adapter, or a coupler to the former.

The primary container 240 is virtually outlined as a circle connected to the valve 220. The primary container 240 can be of any fashion known in the art for storing, compounding, handling, or transferring a beneficial agent, however, as will be taught in this disclosure, the primary container 240 preferably comprises at least one flexible wall capable of deforming to adjust its internal capacity to the beneficial agent volume. This flexible wall act as a barrier between ambient air and the beneficial agent, and ensures that the beneficial agent pressure in the primary container 240 and elsewhere in the CSTD 200 is near ambient air pressure.

FIG. 2*a* illustrates CSTD arrangement 200 when it is not connected to a destination port 250 (first configuration, or metering state), either before or after such a connection was made.

In one embodiment of the CSTD arrangement 200 the valve 220 further comprises a needle 225 and a forward septum 223 configured to interface with the destination port 250, wherein: in the first configuration the needle 225 does not penetrate through the forward septum 223 and the forward septum 223 blocks fluid communication between the valve 220 and the destination port 250; and in the second configuration the needle 225 penetrates through the forward septum 223 and establishes fluid communication between the valve 220 and the destination port 250. The needle 225 can be any of a metal needle, a tube, a molded part, integrated or attached to adjacent part, or of any other embodiment of an elongated hollow body that can penetrate through the forward septum 223 to establish fluid communication between the valve 220 and the destination port 250 through the hollow portion of the elongated body, and prevent fluid communication around the hollow body. The forward septum 223 (also referred to as a seal, stopper, or plunger) may be of various embodiments that provide a seal between the valve cavity 228 and the delivery port 230 and is openable by the needle 225. The forward septum 223 can be made of silicone or other elastic materials known in the art of a combination of a rigid and elastic materials.

In one embodiment the CSTD arrangement 200 the valve 220 comprises a valve carriage 229, comprising a tubular body 221, the forward septum 223 and a rear septum 224, forming a valve cavity 228 therebetween, in fluid communication with the primary container 240 via port 222. The carriage may be moveably disposed in the valve housing 231, between its current metering state to a delivery state, and is biased to its metering state by spring 226. Effectively, the spring 226 biases the valve 220 to the first configuration. The needle 225 forms fluid communication between the syringe 210 and the valve carriage 229 (or "carriage"). The rear septum 224 seals against the needle 225 and may be of various embodiments that prevent liquid from leaking out of the valve cavity 228 around the needle 225. The rear septum 224 can be made of silicone or other elastic materials known in the art of a combination of a rigid and elastic materials.

The distal end of the housing 231 is in a form of a female Luer connector 232, configured to communicate with the male connector of the syringe body 211. In one arrangement the syringe 210 is configured to be threaded onto the valve housing 231 and thereafter the syringe is locked to the valve housing 231 and cannot be removed. Fluid communication between the syringe 210 and the primary container 240 is interfaced through the valve cavity 228, whereby retracting the syringe's plunger 212 will move fluid from primary container 240 to the syringe 210, and advancing the syringe plunger 212 toward the tip of the syringe 210 will move fluid from the syringe 210 to the primary container 240. In this metering state the beneficial agent can be metered into the syringe 210 and any air present in the syringe can be pushed back into the primary container 240. Additionally, if the dose that was initially metered into the syringe 210 exceeded the desired amount, excess beneficial agent can be pushed back into the primary container 240 to reach the desired dose. In one arrangement, a first constituent of the beneficial agent in the primary container 240 needs to be mixed with a second constituent of the beneficial agent that is in the syringe 210, for example in the event that the first constituent is in a dry form (lyophilized or spray-dried), and the second constituent is the required diluent for solubilizing the first constituent for injection. In the valve's metering state, the second constituent can be pushed into the primary container 240. It can also be moved back and forth into and from the primary container 240 to facilitate homogenous mixing of the beneficial agent. The flexible wall of the primary container ensures that the beneficial agent and its constituents in the CSTD arrangement 200 remain at close to ambient pressure, reducing the risk of beneficial agent leakage from the CSTD arrangement 200, and of foreign material to be forced into the CSTD arrangement 200. In one arrangement, a check valve is disposed between the primary container 240 and the valve cavity 228 to allow beneficial agent to move from the primary container 240 to the syringe 210, and prevent flow from the syringe 210 into the primary container 240.

FIG. 2*a* additionally illustrates an embodiment of the CSTD arrangement 200 where the CSTD arrangement 200 further comprises the destination port 250 configured to manipulate the valve 220 from the first configuration wherein the destination port 250 is disengaged from the delivery port 230, to the second configuration wherein the destination port 250 is engaged with the delivery port 230. The destination port 250 comprises a body 251, comprising a fluid passageway, 253 between a distal end in a form of a Luer connector 254, and a proximal end which is sealed by septum 252. The septum 252 in the first configuration blocks fluid communication between the delivery port 230 and the destination port 250, and in the second configuration the needle 225 penetrates through the septum 252 to establish fluid communication between the delivery port 230 and the destination port 250.

The Luer connector 254 of the destination port 250 may be connected to a second destination. In some embodiments the destination port 250 is configured to communicate with at least one of an intravenous delivery system, a catheter, a tube, a needle, or a combination thereof.

FIG. 2*b* illustrates CSTD arrangement 200 when the delivery port 230 is brought in contact with the destination port 250. The spring 226 serves to establish a set force between the forward septum 223 and the septum 252 before the carriage 229 starts moving, thereby ensuring a strong seal between the delivery port 230 and the destination port 250 before the valve 220 is moved from the metering state to the delivery state. This seal ensures that the beneficial agent will not leak out of the CSTD arrangement 200 during transfer of material between the destination port 250 and the CSTD arrangement 200, and that foreign materials will not ingress the CSTD arrangement 200 to contaminate the beneficial agent.

FIG. 2*c* illustrates the CSTD arrangement 200 where the valve 220 is in the second configuration (delivery state). Pushing the destination port 250 into the delivery port 230 overcomes the spring 226 force and moves the carriage 229 backward, causing the tip of the needle 225 to move out of the valve cavity 228 and penetrate the septum 252 of the destination port 250, establishing fluid communication between the syringe 210 and the destination port 250, and allowing transfer of the metered dose of the beneficial agent to the destination port 250. Note that in this state fluid can also be drawn from the destination port 250 into the syringe 210, but where this is not desired, a check valve can be implemented in passageway to block the flow from to the destination port 250 to CSTD arrangement 200.

In the second configuration the forward septum 223 and the septum 252 establish a fluid-tight seal preventing the beneficial agent from leaking out of the CSTD arrangement 200. The septum 252 can be made of silicone or other elastic materials known in the art of a combination of a rigid and elastic materials. The seals that are formed between contact surfaces of the needle 225 and the rear septum 224, and the needle 225 and the forward septum 223 isolate the primary container 240 from both the destination port 250 and the syringe 210, ensuring that no beneficial agent can be moved from the primary container 240 to the destination port 250, and that no additional dose of beneficial agent can be metered into the syringe 210 without first disconnecting the CSTD arrangement 200 from the destination port 250.

In one embodiment, a check valve is disposed between the primary container 240 and the valve cavity 228 to allow beneficial agent to move from the primary container 240 to the syringe 210, and to prevent flow from the syringe 210 into the primary container 240. When the destination port 250 is removed from the delivery port 230 the spring 226 moves the valve carriage 229 back to the forward position and the valve 220 returns to the first configuration (metering state). While the seal of the forward septum 223 has been compromised from the piercing of the needle 225 at the delivery state, the pressure in the valve cavity 228 remains balanced with the ambient pressure therefore no leak will occur through the pierced region of the forward septum 223.

The connection between the primary container 240 and the valve 220 can be of various types known in the industry including: a) a fixed, permanent connection from during the manufacturing process of the CSTD arrangement 200, b) a removable connection such as a Luer connection, and c) a leak tight connection similar to the leak-tight delivery port 230 or other leak-tight connector types known in the art.

Figure 3:
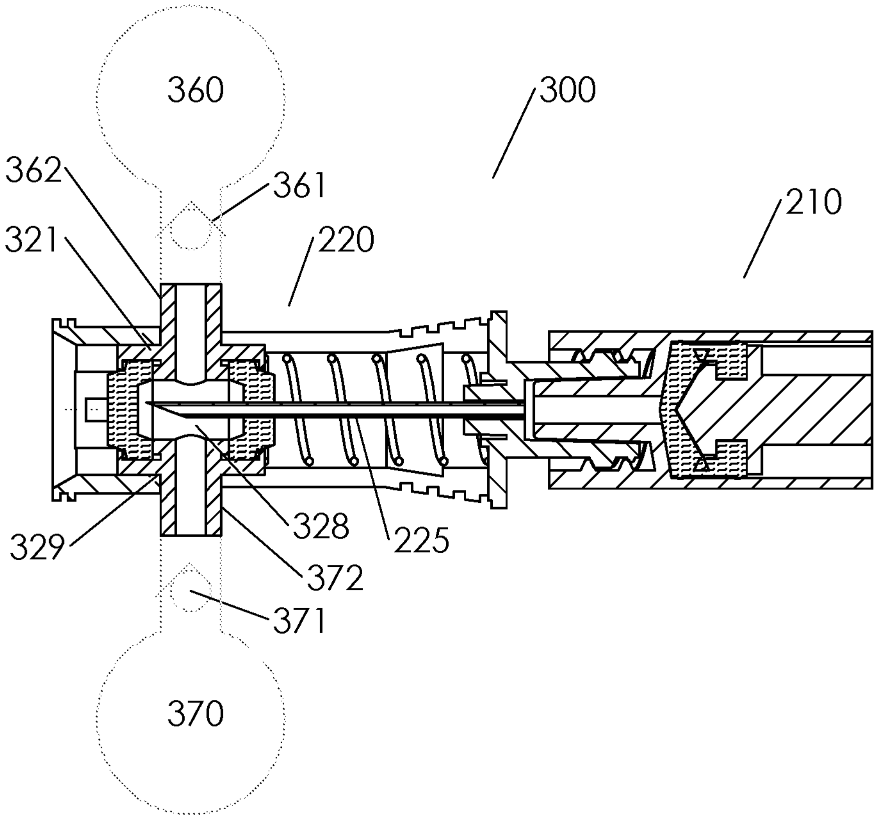
FIG. 3 illustrates a CSTD arrangement with a receptacle.

FIG. 3 illustrates another arrangement of CSTD 300, similar to the CSTD arrangement 200 of FIGS. 2*a*-2*c* and further comprising a receptacle 370 in fluid communication with the valve 220 such that in the first configuration a metering pump (e.g., syringe 210) can only receive fluid from the primary container 360, and the syringe 210 can only push fluid to the receptacle 370. The valve carriage 329 communicates with the primary container 360 via a port 362 in the carriage body 321, and it also communicates with the receptacle 370 via a second port 372 in the carriage body 321. A first check valve 361 is disposed in the fluid passageway between the primary container 360 and the syringe 210, enabling a unidirectional flow from the primary container 360 to the syringe 210. The first check valve 361 may be located in the primary container 360 or the carriage 329. A second check valve 371 is disposed in the fluid passageway between the syringe 210 and the second receptacle 370, permitting a unidirectional flow from the syringe 210 to the receptacle 370. The second check valve 371 may be located in the receptacle 370 or in the carriage 329. The receptacle 370 may comprise at least one wall made from a flexible material, capable of adjusting the internal capacity of the receptacle 370 to the volume of fluid that it contains, while maintaining pressure equilibrium with ambient air pressure. This CSTD arrangement 300 is particularly advantageous where it is desired not to permit fluids that have been outside the primary container 360 to move into the primary container 360, such as air from the syringe 210 or excess beneficial agent. Possible reasons for that requirement are concerns of contamination or foaming of the beneficial agent in the primary container 360. In one arrangement of the CSTD 300 the primary container 360 and the second receptacle 370 are compartments of the same package.

Figure 4A:
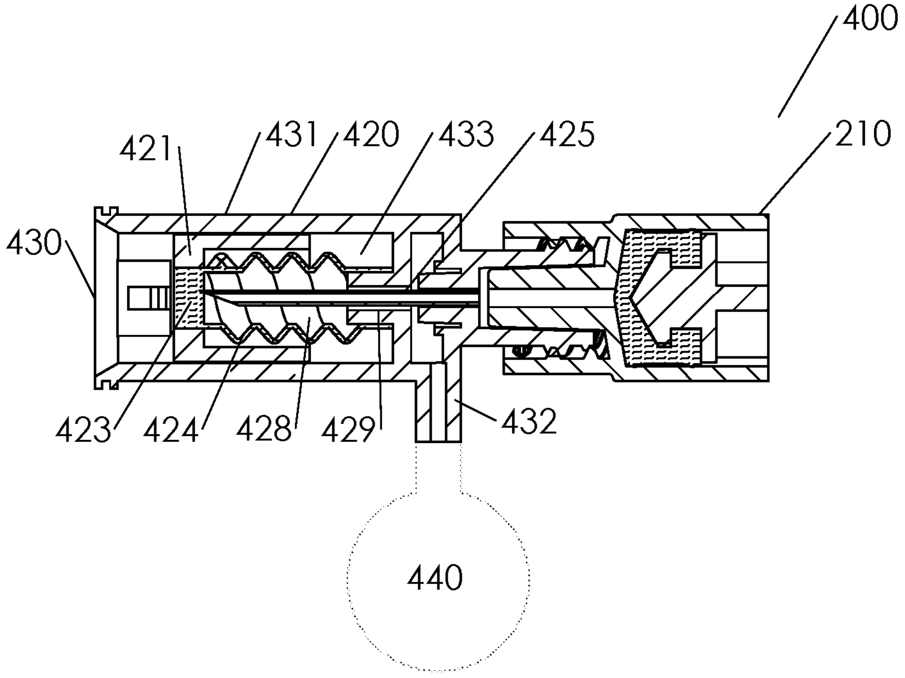
FIGS. 4*a*-4*b* illustrate a CSTD arrangement where the valve comprises a bellows.
Figure 4B:
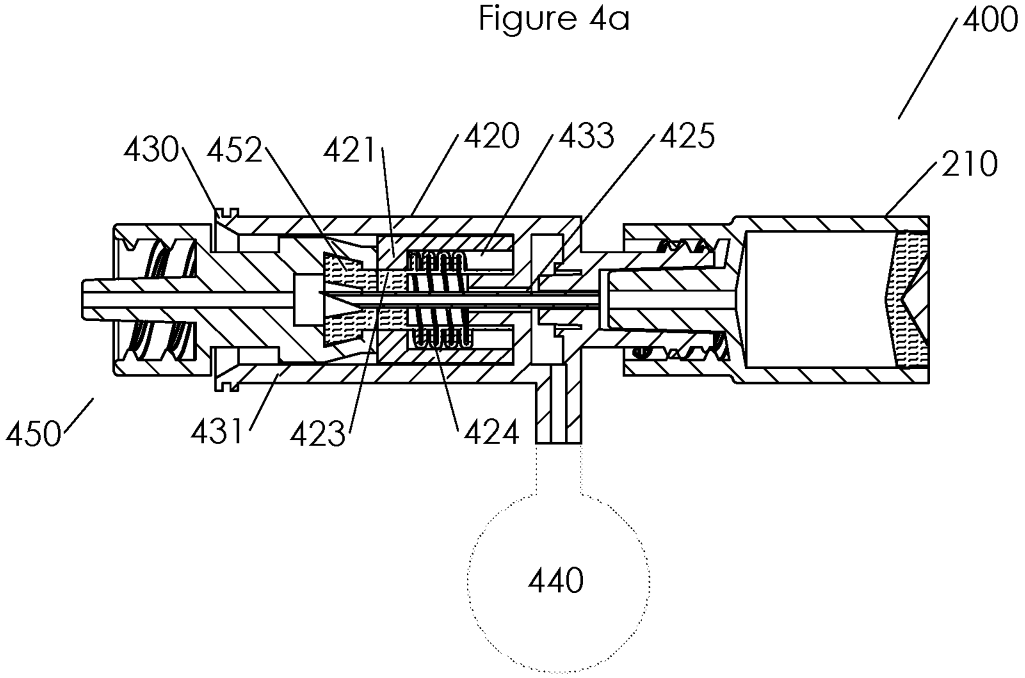

FIGS. 4*a* and 4*b* illustrate another arrangement of a CSTD 400, similar to the CSTD arrangement 200 of FIGS. 2*a*-2*c* except for some of the components of the valve 420. In this arrangement the forward septum and the spring are combined into a single component. The valve 420 comprises a rigid tubular body 421, axially moveable within the valve housing 431. At its forward end, the moveable body 421 accommodates the forward septum 423 comprising a bellows 424 that extends rearward and forms a cavity 428 between the valve housing 431 and the forward septum 423. The bellows 424 acts as a spring that biases the moveable body 421 to the metering state. In one arrangement a spring is added in the space 433 in the housing 431, and external to the bellows 424. This spring would bias the moveable body 421 to the metering state of the valve 420.

FIG. 4*a* illustrates the CSTD arrangement 400 when the valve 420 is in the first configuration (metering state), where fluid communication is established between a metering pump (e.g., syringe 210) and the primary container 440 via needle 425, cavity 428, passageway 429 between the needle 425 and the valve housing 431, and the primary container connection 432. Fluid can be moved from the primary container 440 into the syringe 210 and vice versa.

FIG. 4*b* illustrates the CSTD arrangement 400 when the delivery port 430 is engaged with a destination port 450, moving the valve 420 to the second configuration (delivery state). The tip of the needle 425 is outside of the cavity 428 preventing fluid communication between a metering pump (e.g., syringe 210) and the primary container 440. The tip of the needle 425 is penetrating through the forward septum 423 and the septum 452 of the destination port 450, and establishes fluid communication between the syringe 210 and the destination port 450.

Figure 5:
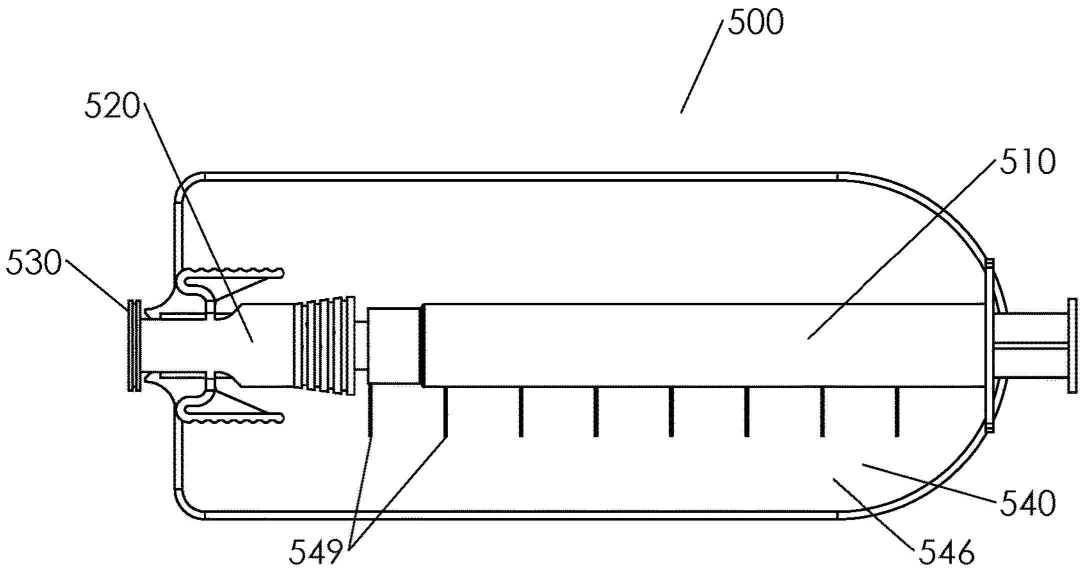
FIG. 5 illustrates a CSTD arrangement where the backing of the primary container is oriented in parallel to the syringe and has a dosing scale graduation.

FIG. 5 illustrates an arrangement of a CSTD 500, similar to the CSTD 200 of FIG. 2, but where the backing 546 is arranged in parallel and along the long axis of the metering pump 510. Advantageously, in this arrangement information can be presented on the backing 546 in a graphic or text form to facilitate the use of the device. While the metering pump 510 may be marked with the typical milliliter graduation scale, the backing 546 is marked with graduation 549 that may provide supplemental or alternative information that is specific to the beneficial agent application. In one arrangement of the CSTD 500 the graduation 549 on the backing 546 is of the weight of active pharmaceutical ingredient (API) of the dose, typically provided in units (e.g. milligrams/deciliter) or weight (typically in milligrams). In many instances a prescription of a drug is provided in units that are different from the regular volumetric graduation of a syringe, e.g. in milligrams or units. When a regular syringe is used to meter the dose, the healthcare practitioner (e.g. pharmacist, nurse) is required to convert the prescription to the units of the syringe's graduation, which might be a source for dosing errors. By providing alternative or supplemental information on the backing 546 the unit conversion process may be verified or avoided altogether. The backing 546 may also be printed with all the beneficial agent's labeling required by the relevant regulations.

Figure 6:
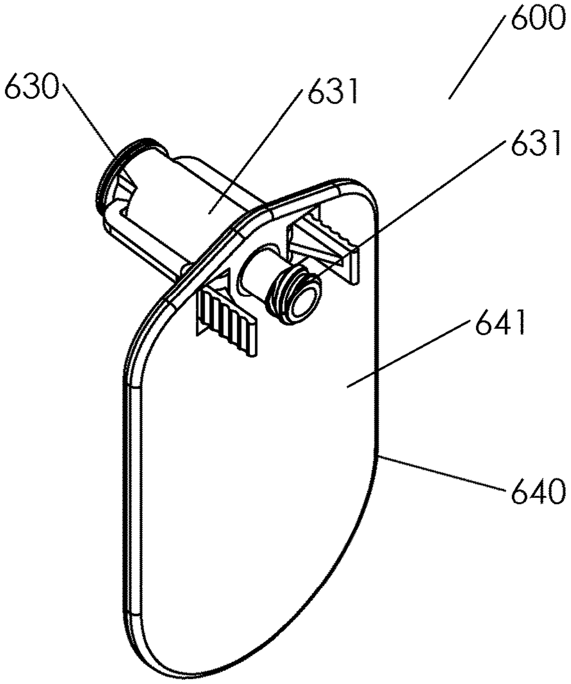
FIG. 6 illustrates a CSTD arrangement where the primary container backing, and the valve are combined, and the valve axis is perpendicular the backing plane.

FIG. 6 illustrates another arrangement of a CSTD 600, similar to the CSTD 200 of FIG. 2 but where the valve housing 631 is integrated with the backing 641 of the primary container 640. The axis of the delivery port 630 is oriented in perpendicular to the backing 641. At least a portion of the valve housing 631 and the backing 641 can be made of the same manufactured part.

Figure 7:
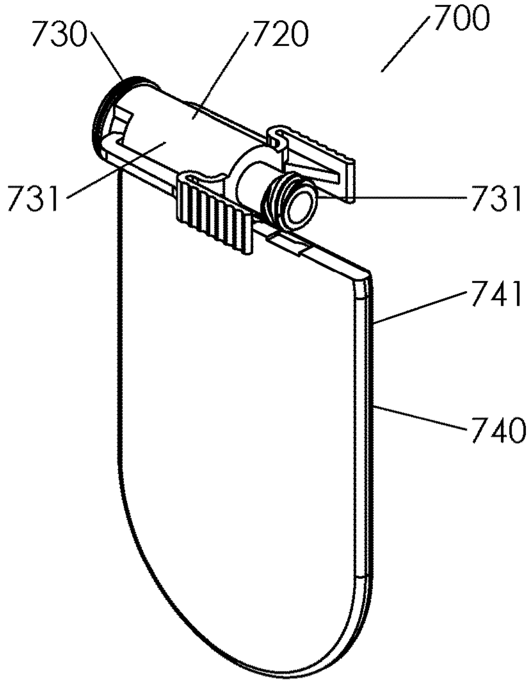
FIG. 7 illustrates a CSTD arrangement where the primary container backing, and the valve are combined, and the valve axis is perpendicular the backing plane.

FIG. 7 illustrates another arrangement of a CSTD 700, similar to the CSTD 200 of FIG. 2 but where the valve housing 731 is integrated with the backing 741 of the primary container 740. The axis of the delivery port 730 is in parallel to the backing 741. At least a portion of the valve housing 731 and the backing 741 can be made of the same manufactured part.

Figure 8A:
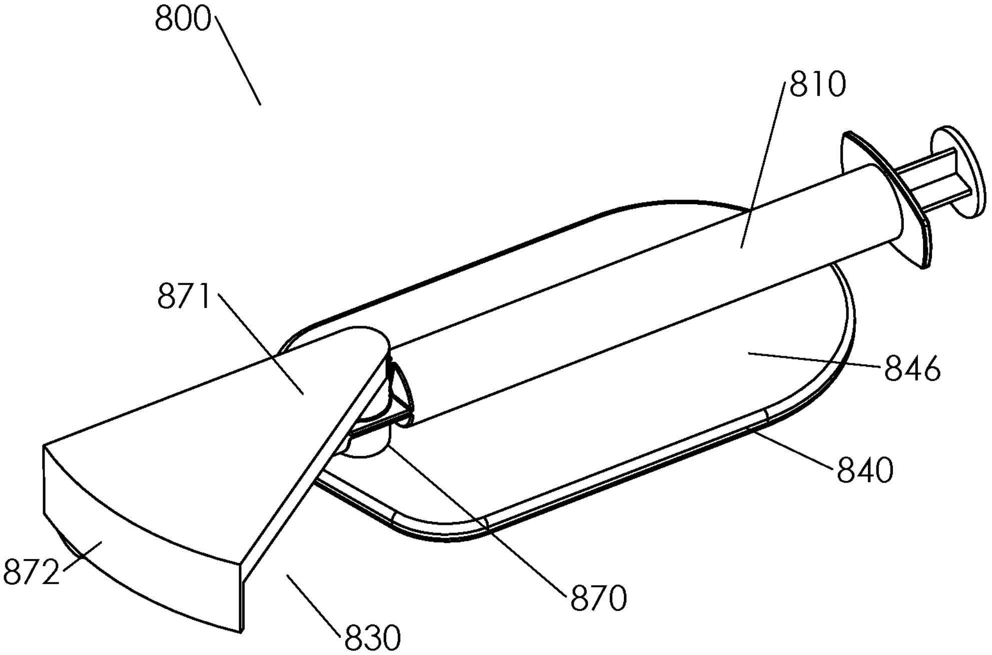
FIGS. 8*a*-8*b* illustrate a CSTD arrangement comprising a stopcock valve.
Figure 8B:
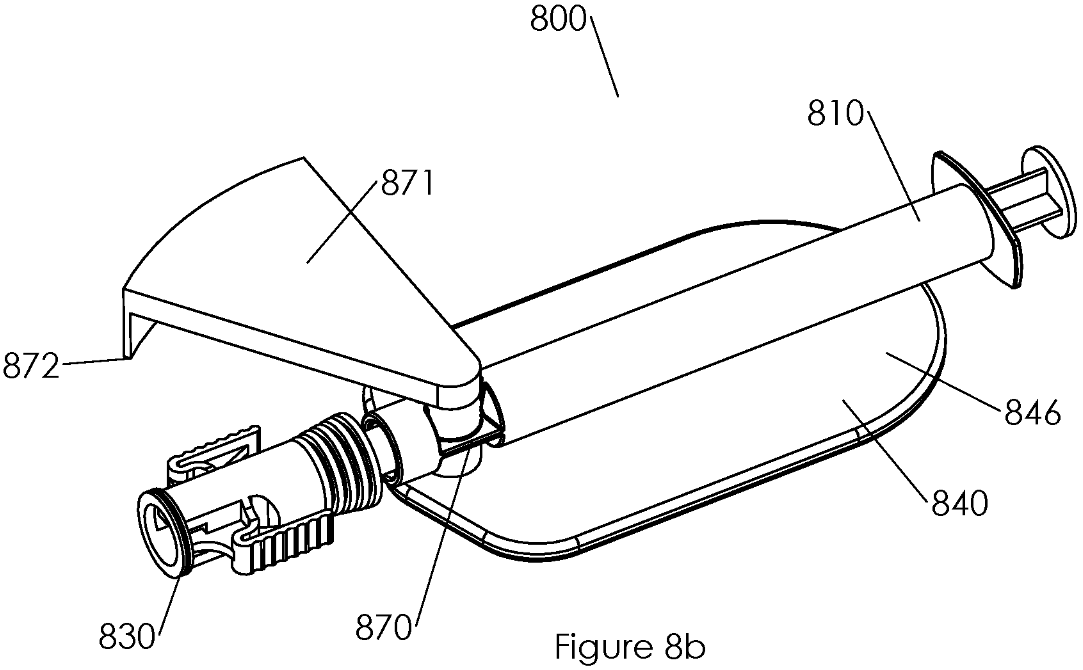

FIGS. 8*a* and 8*b* illustrate a CSTD arrangement 800 similar to the CSTD 200 of FIG. 2 but where the valve is in a form of a stopcock valve operable by a lever which also functions to occlude the delivery port in the metering state thus preventing user from connecting the CSTD arrangement 800 to a destination. CSTD arrangement 800 comprises a metering pump in a form of a syringe 810, a delivery port 830, a primary container 840 comprising a backing 846, and a valve 870 communicating with said primary container 840, the syringe 810, and the delivery port 830. The valve 870 comprises a stopcock, moveable between the first configuration (metering state), where communication is established between the primary container 840 and the syringe 810 and the primary container 840, and the second configuration (delivery state) where fluid communication is established between the syringe 810 and the delivery port 830. The valve 870 comprises a rotating actuation lever 871 which operates the stopcock. The rotating actuation lever 871 comprises a protrusion 872 that, in the metering state, prevents the delivery port 830 from being connected to a destination port.

FIG. 8*a* illustrates the CSTD 800 in the first configuration (metering state) wherein the rotating actuation lever 871 is generally oriented in line with the syringe's 810 long axis, and the valve 870 is in the first configuration. The protrusion 872 occludes the delivery port 830, preventing user from connecting the delivery port 830 to a destination.

FIG. 8*b* illustrates the CSTD 800 in the second configuration (delivery state) wherein the rotating actuation lever 871 is generally oriented in perpendicular to the syringe's 810 long axis. The protrusion 872 does not occlude the delivery port 830, allowing user to connect the delivery port 830 to a destination.

Figure 9A:
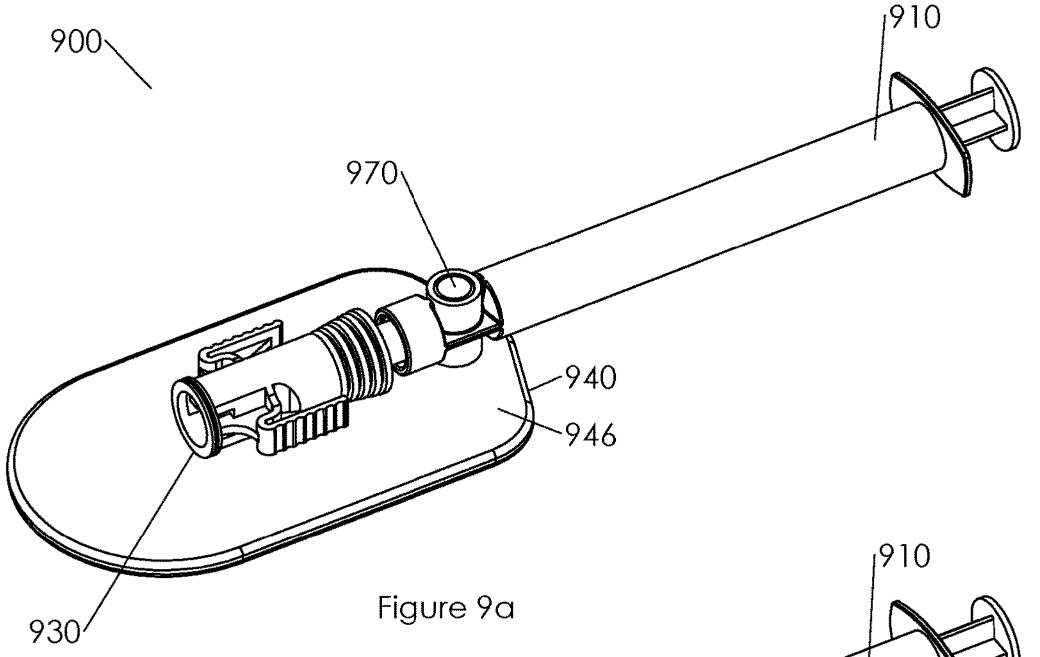
FIGS. 9*a*-9*c* illustrate a CSTD arrangement comprising a stopcock valve wherein the backing of the primary container is the handle of the stopcock valve.
Figure 9B:
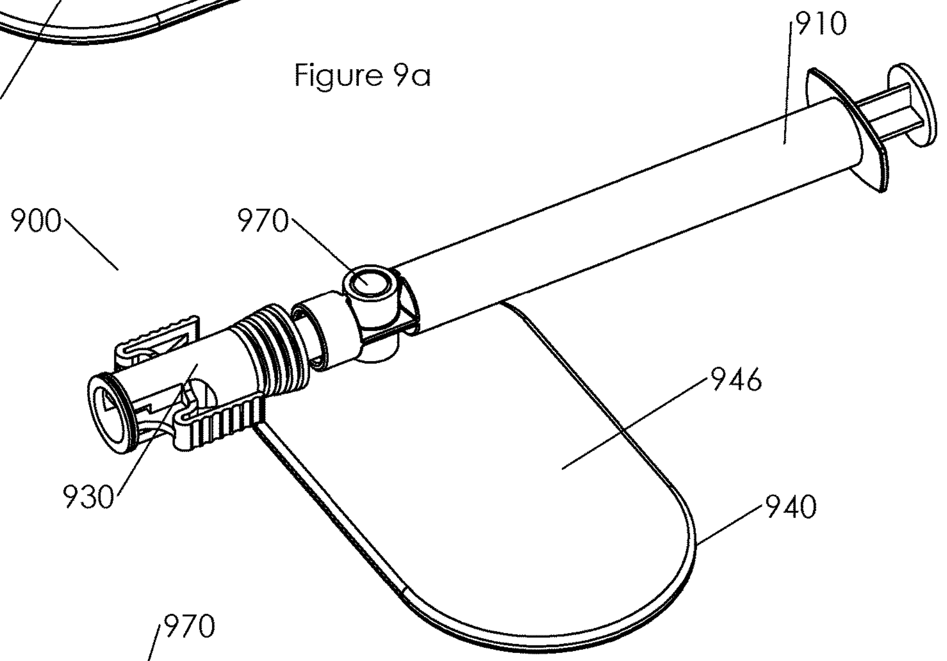

FIGS. 9*a* and 9*b* illustrate a CSTD arrangement 900, comprising a metering pump in a form of a syringe 910, a delivery port 930, a primary container 940 comprising a semi-rigid backing 946, and a valve 970 communicating with said primary container 940, syringe 910, and the delivery port 930. The valve 970 comprises a stopcock, moveable between the first configuration (metering state), where communication is established between the primary container 940 and the syringe 910, and the second configuration (delivery state) where fluid communication is established between the syringe 910 and the delivery port 930. The primary container 940 communicates with the valve 970 through the center of the rotating core of the stopcock valve 970. The backing 946 is connected with the core of the stopcock of the valve 970 and serves as the rotating lever of the stopcock, operable between the metering state and the delivery state of the valve 970.

FIG. 9*a* illustrates the CSTD 900 in the first configuration wherein the long axis of the backing 946 and the long axis of the syringe 910 are parallel and the backing 946 extends beyond the delivery port 930 to interrupt access of a destination for engagement with the delivery port 930, and wherein the valve 970 is in the metering state.

FIG. 9*b* illustrates the CSTD 900 in the second configuration wherein the backing 946 is turned in a perpendicular direction to the syringe 910, enabling access of a destination for engagement with the delivery port 930, and wherein the valve 970 is in the delivery state.

Figure 9C:
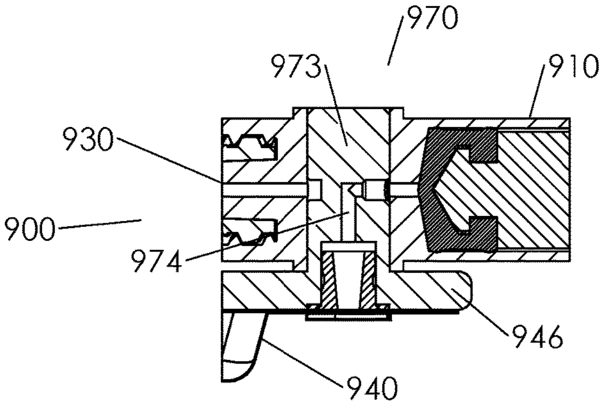

FIG. 9*c* is a partial cross section view of the CSTD 900 illustrating the valve 970 in the metering state. The valve 970 interfaces three fluid passageways connecting with the primary container 940, syringe 910 and the delivery port 930. The rotating core 973 of the stopcock valve 970 is a cylindrical protrusion of the backing 946. The core 973 establishes fluid communication between the syringe 910 and the primary container 940, while isolating the fluid passageway that leads to the delivery port 930.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A closed system transfer device (CSTD) arrangement for storing a beneficial agent and transferring the beneficial agent to a destination port, the CSTD arrangement comprising:

a primary container for storing the beneficial agent comprising at least one flexible wall such that pressure in the primary container is substantially equalized to ambient pressure;

a metering pump;

a delivery port for communicating the beneficial agent with the destination port; and a valve in selective fluid communication with the primary container, the metering pump, and the delivery port, the valve comprising a valve housing, wherein:

the primary container extends from the valve housing, the metering pump is joined to the valve housing, the delivery port is an opening in the valve housing configured to accommodate the destination port, the destination port is engageable with the valve to manipulate the valve from a first configuration to a second configuration, in the first configuration, the primary container and the metering pump are in fluid communication, and neither is in fluid communication with the delivery port, in the second configuration, the metering pump is in fluid communication with the delivery port, and neither is in fluid communication with the primary container, and the at least one flexible wall is configured to collapse when the beneficial agent is transferred from the primary container to the metering pump.

2. The CSTD arrangement of claim 1, wherein the valve further comprises a needle and a forward septum configured to interface with the destination port, wherein:

in the first configuration the needle does not penetrate through the forward septum and the forward septum blocks fluid communication between the valve and the destination port; and in the second configuration the needle penetrates through the forward septum and establishes fluid communication between the valve and the destination port.

3. The CSTD arrangement of claim 2, wherein the destination port is configured to manipulate the valve from the first configuration, in which the destination port is disengaged from the delivery port, to the second configuration, in which the destination port is engaged with the delivery port, and wherein the destination port comprises a septum which, in the first configuration, blocks fluid communication between the delivery port and the destination port and, in the second configuration, the needle penetrates through the septum to establish fluid communication between the delivery port and the destination port.

4. The CSTD arrangement of claim 3, wherein in the second configuration the forward septum and the septum establish a fluid-tight seal preventing the beneficial agent from leaking out of the CSTD arrangement.

5. The CSTD arrangement of claim 1, wherein the at least one flexible wall comprises at least one of a film, a foil, a molded component, or a blow-molded component.

6. The CSTD arrangement of claim 1, wherein the primary container comprises at least a first compartment containing at least a first constituent of the beneficial agent.

7. The CSTD arrangement of claim 6, wherein the primary container further comprises at least a second compartment containing at least a second constituent of the beneficial agent, wherein the first compartment and the second compartment are separated by a frangible seal that, when opened, allows the first and the second constituents of the beneficial agent to aseptically merge.

8. The CSTD arrangement of claim 1, wherein the metering pump is a syringe.

9. The CSTD arrangement of claim 8, wherein the syringe is configured to be threaded onto the valve housing and thereafter the syringe is locked to the valve housing and cannot be removed.

10. The CSTD arrangement of claim 8, wherein the syringe comprises a graduation correlating to dosing options of the beneficial agent.

11. The CSTD arrangement of claim 1, wherein the destination port is configured to communicate with at least one of an intravenous delivery system, a catheter, a tube, a needle, or a combination thereof.

12. The CSTD arrangement of claim 1, further comprising:

a spring that biases the valve to the first configuration.

13. The CSTD arrangement of claim 12, further comprising:

a forward septum and where the forward septum and the spring are combined into a single component.

14. The CSTD arrangement of claim 1, further comprising:

a receptacle in fluid communication with the valve such that in the first configuration the metering pump can only receive fluid from the primary container, and the metering pump can only push fluid to the receptacle.

15. The CSTD arrangement of claim 1, further comprising:

a latch mechanism for holding the destination port joined to the delivery port such that the valve remains in the second configuration.

16. The CSTD arrangement of claim 1, wherein the primary container further comprises a semi-rigid backing for supporting the primary container and interfacing the primary container with the valve.

17. The CSTD arrangement of claim 1, wherein the valve comprises a body configured to provide fluid communication with the primary container and the metering pump in the first configuration and to pierce a septum to provide fluid communication between the metering pump and the delivery port in the second configuration.

18. A closed system transfer device (CSTD) arrangement for transferring a beneficial agent to a destination port, the CSTD arrangement comprising:

a primary container configured to store the beneficial agent, the primary container including at least one flexible wall configured to collapse in response to transfer of the beneficial agent from the primary container;

a metering pump; and a valve, comprising a valve housing including a delivery port, the valve housing coupled to the primary container and the metering pump, wherein the valve is selectively manipulable in response to engagement between the delivery port and the destination port to transition the valve from a first configuration in which the valve provides fluid communication between the primary container and the metering pump to the exclusion of the destination port to a second configuration in which the valve provides fluid communication between the metering pump and the delivery port to the exclusion of the primary container.

* * * * *